(No Model.) 3 Sheets—Sheet 3.
A. P. GOULD.
DENTAL CHAIR.
No. 478,590. Patented July 12, 1892.
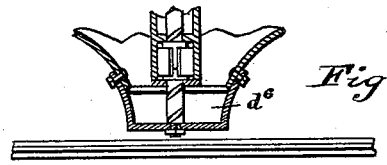
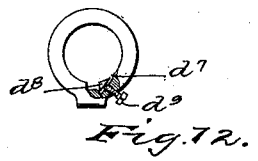
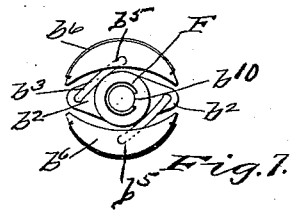
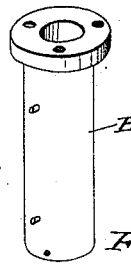
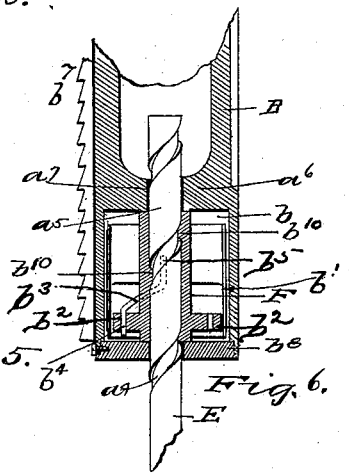
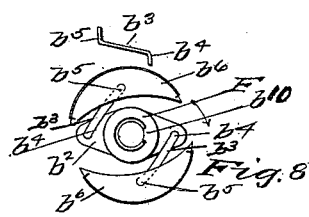
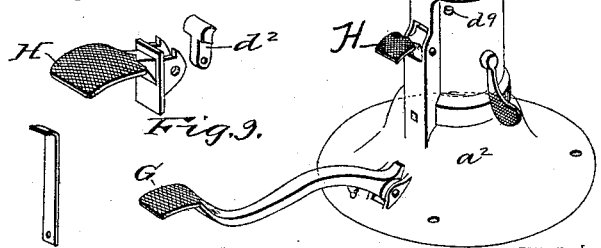
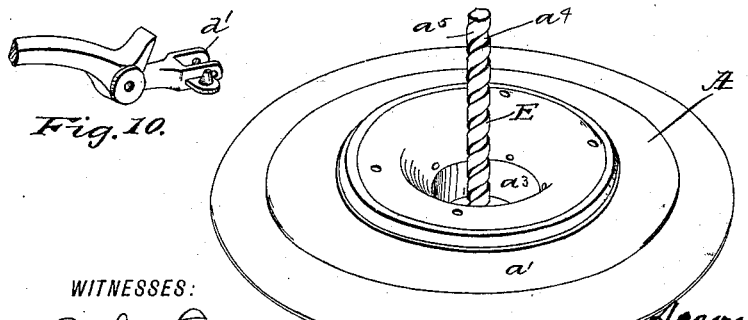
WITNESSES: INVENTOR
Aaron P. Gould
BY
ATTORNEY.

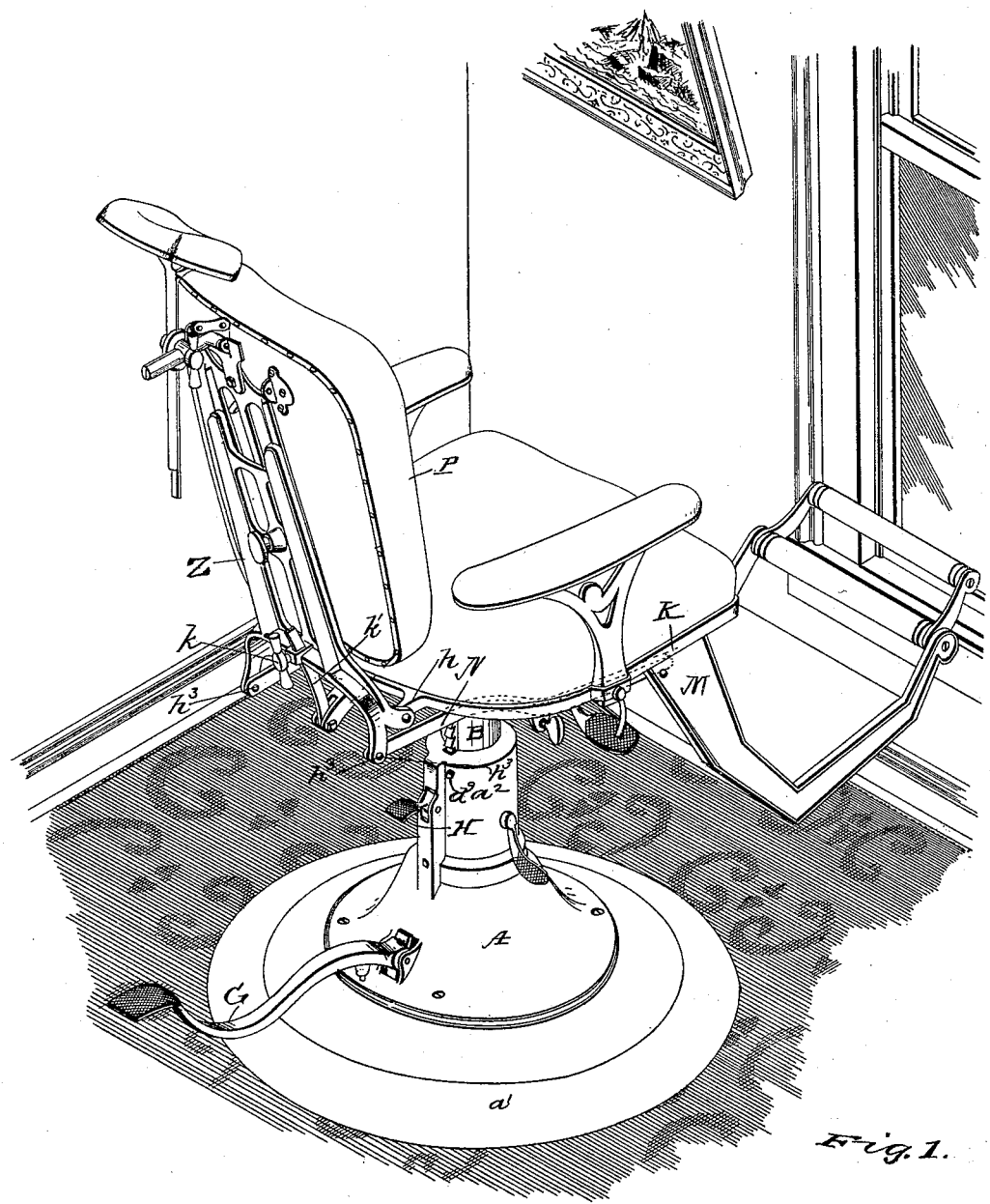

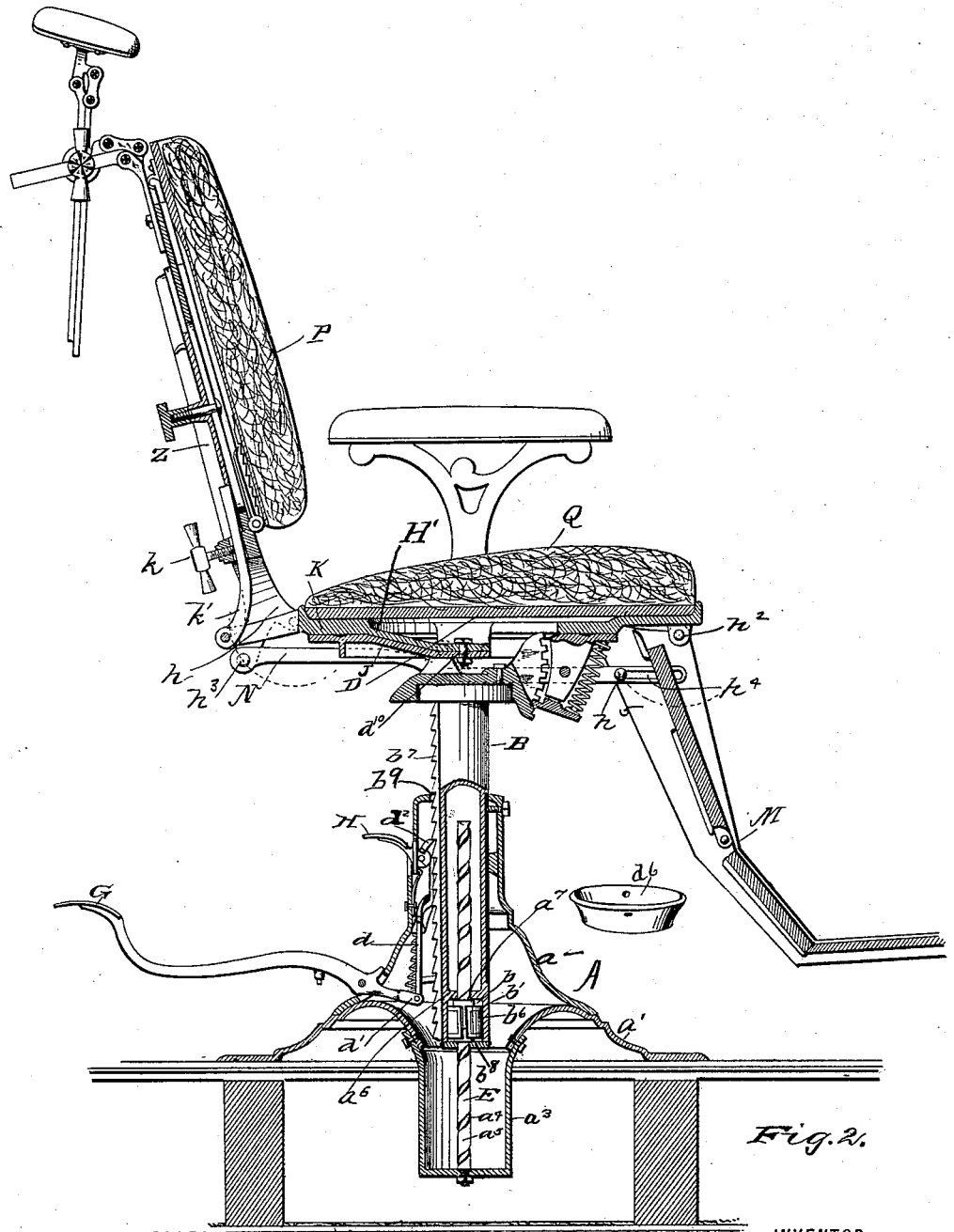

UNITED STATES PATENT OFFICE.

AARON P. GOULD, OF CANTON, OHIO.

DENTAL CHAIR.

SPECIFICATION forming part of Letters Patent No. 478,590, dated July 12, 1892.

Application filed June 5, 1890. Serial No. 354,400. (No model.)

*To all whom it may concern:*

Be it known that I, AARON P. GOULD, a citizen of the United States, and a resident of Canton, county of Stark, State of Ohio, have invented a new and useful Improvement in Dental Chairs, of which the following is a full, clear, and exact description, reference being had to the accompanying drawings, making part of this specification.

My invention relates to improvements in dental chairs; and it consists in providing improved means for lowering the chair-body and for moving the back, leg, and foot rests.

With these ends in view my invention relates to certain features of construction and combination of parts, as will be hereinafter described, and pointed out in the claims.

Figure 1 of the accompanying drawings is a view in perspective of a dental chair, illustrating my invention. Fig. 2 is a side elevation of same, partly sectional. Fig. 3 is a perspective of the bottom portion of the base; Fig. 4, a similar view of the top portion of the base; Fig. 5, a similar view of the vertically-adjustable body-supporting stem and rack. Fig. 6 is a vertical sectional view of same, showing screw and friction devices; Fig. 7, a plan view of brake-shoes closed in against the driving-hub; Fig. 8, a similar view of brake-shoes expanded or thrown out for action, rotating in the direction shown by the arrow. Fig. 9 is a perspective comprising a foot-lever pawl and spring. Fig. 10 is a perspective of the inner end portion of the lifting foot-lever; Fig. 11, a similar view of lifting-pawl; Fig. 12, a plan view of the top of the base, showing detail; and Fig. 13 is a fragmentary sectional view of a modification.

Similar letters of reference indicate corresponding parts in all of the figures of the drawings.

The base A is composed of a bottom portion $a'$ and a conical upper portion $a^2$. The form of these parts may be varied when other forms are preferred, as I do not desire to be limited in this specification to any particular form of base, as other forms may be used to which my invention may be applied and operated with equal success. Having made this statement, I will proceed with a description of my invention, as illustrated in the drawings. In the central portion of the base-bottom $a'$ is provided a depression or well portion $a^3$, that may extend downwardly through the floor of the operating-room to provide for a greater vertical movement of the supporting-stem B and seat-body D; but when preferred the central portion of the base may be terminated at any desired point above the floor.

To the central portion of the base A, whether it is projected to a point below the floor or terminates at a point above the floor, is secured a vertical non-rotatable rod E, having cut therein an annular spiral groove $a^4$, forming an annular thread $a^5$ of quick or swift pitch. The portion $a^2$ of the base is placed over the screw-rod E and secured to the bottom portion by bolts in the usual way. At the lower end portion of the stem B is provided a cylindrical-chambered portion $b$, separated from the upper interior portion of the stem by a dividing portion $a^6$, in which is formed a support $a^7$ for the screw E and the upper portion of the nut F, the said nut having an annular thread $B^{10}$ to correspond with the groove $a^4$ in the rod E and arms $b^2$, to which are pivotally secured arms $b^3$ by placing the inner cranked portions $b^4$ of said arms in apertures provided in the end portions of the arms $b^2$, and the outer cranked end portions $b^5$ of the arms $b^3$ are pivotally secured, as shown in Figs. 7 and 8, to winged friction clutches or shoes $b^6$, said shoes being semicircular in form, the outside diameter to conform to the inside diameter of the cylinder-chamber $b$ in the stem B. A rack $b^7$ is secured to the stem B by the dowel-pins, (shown,) the upper end resting under and against the flange about the upper end of the stem. A cap or end piece $b^8$ is secured to the lower end of the stem B to close said end to form a support for the lower end of the nut F.

The stem B, with the nut and brake-shoes inclosed, as shown in Fig. 6, is passed down into the aperture $b^9$ in the top portion $a^2$ of base A, the nut F passing down and about the threaded rod or screw E, or the screw E may be turned into the nut before placing the stem B into the base and passed into the base with the stem B, the lower end passed through the bottom of the base and secured therein by a nut, as shown in Fig. 2.

In operation the body of the chair is raised by the repeated downward movement of the outer end of the foot-lever G. The pawl $d$, pivotally secured to the inner end $d'$ thereof, engages the rack $b^7$ to raise the chair. A pawl $d^2$ is provided and engages the rack to prevent the chair-body lowering while the pawl $d$ is in the act of descending to engage another tooth of the rack to raise the chair-body. In passing up the movement is slow and interrupted and the brake-shoes are drawn away from the inside surface of the stem-chamber and rest against the body of the nut F. To lower the chair-body, the foot-lever H is pressed down, by which the pawl $d^2$ is drawn from engagement with the rack $b^7$.

The instant the chair-body begins to descend the nut F will be rotated and the shoes $b^6$ thrown into a frictional engagement with the inner wall $b'$ of the chamber $b$ in the lower portion of the stem B, by which engagement the downward movement of the chair-body is resisted and regulated by the friction of the shoes and the pitch of the tread, which may be varied in construction to determine the speed of the descent of the body of the chair.

Although I have shown and described certain mechanism for raising the chair-body, I would have it understood that I contemplate using any mechanism capable of accomplishing the same result, and therefore do not claim in this specification the mechanism shown and described, as the same, with other features, form the subject-matter of a separate application filed January 17, 1890, Serial No. 337,260.

The advantage of this form of construction consists not only in a great reduction of the initial cost, but in great convenience in the use of the chair. The operating parts relating to the lowering of the chair are all inclosed and secured from dust or violence, and when it is desired to run the mechanism below the floor of the operating-room the result may be accomplished through a small aperture. In construction the chair may be assembled for either a "low" or "high" lift by an exchanging of the stem B and screw E and a substitution of the cap $d^6$, Fig. 13, for the well portion $a^3$.

To compensate for wear and to prevent a slight rotary movement caused thereby, I have provided in the top portion of the base a recess $d^7$, in which is placed an angle-block $d^8$, adapted to rest against the side of the rack $b^7$ and the stem B. Said block may be set or adjusted against the rack and stem by use of the screw $d^9$. This device is not provided for the purpose of arresting the vertical movement of the stem, but to prevent the slightest rotary movement and yet allow the stem to pass up and down freely in its bearings. Rotary movement of the chair-body is accomplished by the circular frame H', sliding on the circular way J about a central pivot $d^{10}$.

The seat-frame K is provided with rearwardly-projecting lugs $h$, to which the back-supporting frame Z is pivotally secured, as shown.

The leg and foot rest frame M is pivoted at its upper front corner to the seat-frame, as shown at $h^2$, the rear upper corner resting against the under side of said frame, and to provide for a forward and upward movement of said leg and foot rest frame a link N is provided, having one of its ends pivotally secured to the lower portion of the back frame Z, as shown at $h^3$, and at the front end the link N is provided with an elongated aperture $h^4$, through which is passed a pin $h^5$, which is secured in the frame M. The object of the said elongated aperture is to allow the back P to be swung forward over the seat Q a distance and back a distance from a vertical plane without moving the frame M from its normal position, as shown in Fig. 2, when a further backward movement of the back will bring the rear end of the aperture $h^4$ against the pin $h^5$, and a continuance of said movement will cause the link N to push the leg and foot rest frame forward and up. The parts so moved may be secured in desired adjustment by turning the screw $k$ against the tongue $k'$, said tongue having a pivotal connection with a portion of the seat-frame, as shown in Figs. 1 and 2. It will be noticed that the seat of the chair does not swing or move forward or back with the back or foot rest, but remains in a fixed position and for that reason may be used as a support for the back. By this movement the head of the patient may be placed below the seat of the chair and the feet raised to a point above or about level with the seat. This movement in a dental chair is found to be desirable, especially when the patient suffers or is slow to recover from the effects of an anæsthetic.

Having thus fully described the nature and object of my invention, what I claim as new, and desire to secure by Letters Patent, is—

1. The combination, in a chair, with a base and a body and means for raising said body, of an intermediate portion secured to the body and adapted for vertical adjustment in the base, said intermediate portion having within its limits a traveling rotary nut, having brake-shoes attached thereto to engage said intermediate portion, and a screw secured to the base portion to rotate said nut, substantially as set forth.

2. The combination, in a chair, with a base and a body and means for raising said body, of a supporting-stem having therein a cylinder portion $b$, a traveling rotary nut F, having brake-shoes attached thereto to rotate therewith and to engage the wall of the cylindrical portion $b$, the cap $b^8$, and a non-rotative screw E, secured to said base and engaging said nut, substantially as set forth.

3. The combination, in a chair, of a base and a body and means for raising said body of the extension $a^3$ of the chamber portion of said base to a point below the floor or base support, a non-rotative screw E, secured to said extension, a vertically-adjustable stem B, having therein a rotary nut adapted to rotate about and travel up and down said screw from point to point above and below said floor or base support, and brake-shoes carried by said nut, substantially as set forth.

4. The combination, with a base-support, of a seat mounted thereon, a leg-rest section and a back-section pivoted to said seat, a pin projecting from one of these sections, and a link having one end pivoted to one of these sections and its opposite end provided with an elongated aperture through which the said pin projects, substantially as set forth.

In testimony whereof I have hereunto set my hand this 17th day of May, 1890.

AARON P. GOULD.

Witnesses:
W. K. MILLER,
CHAS. R. MILLER.